Figure 1:
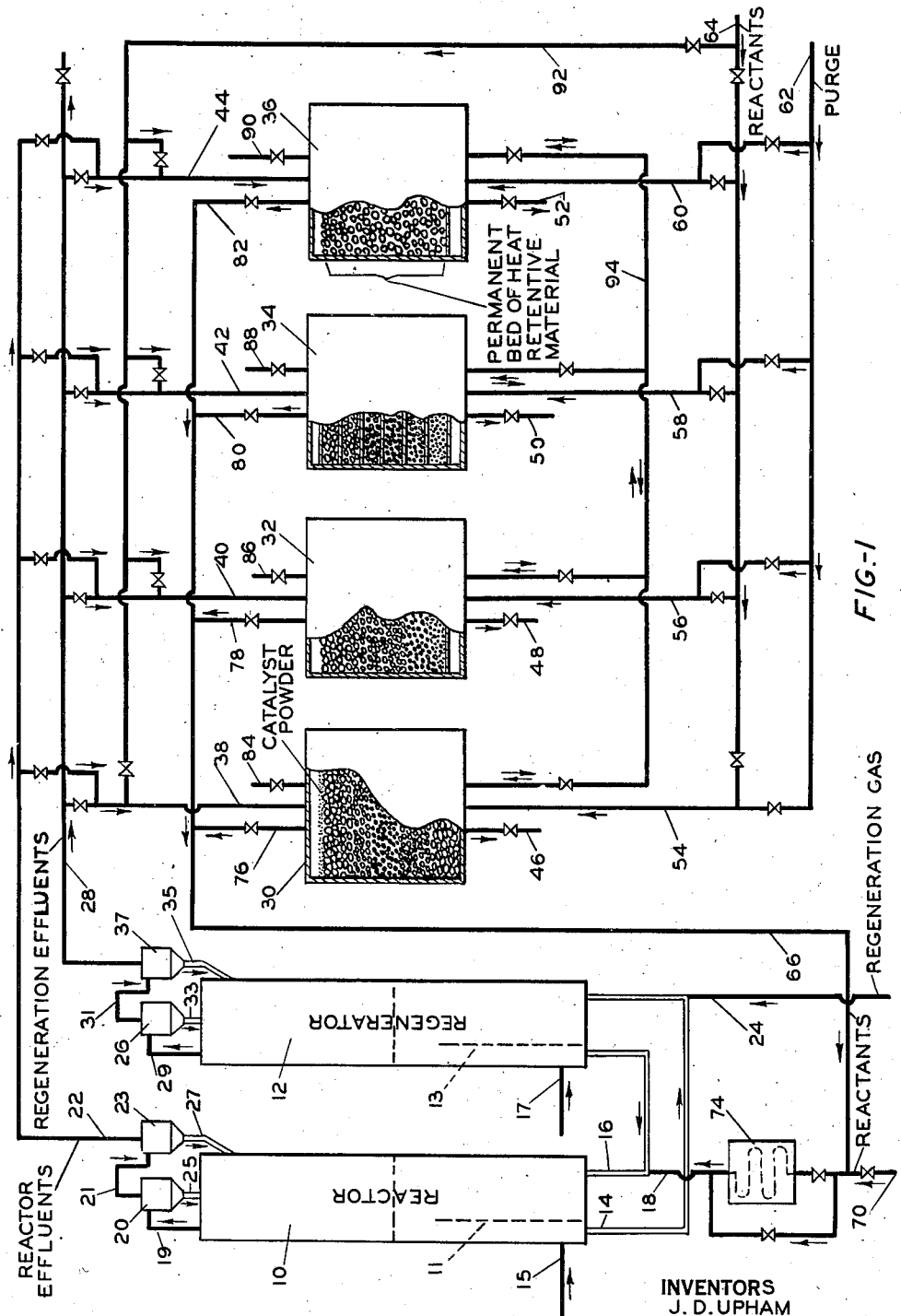

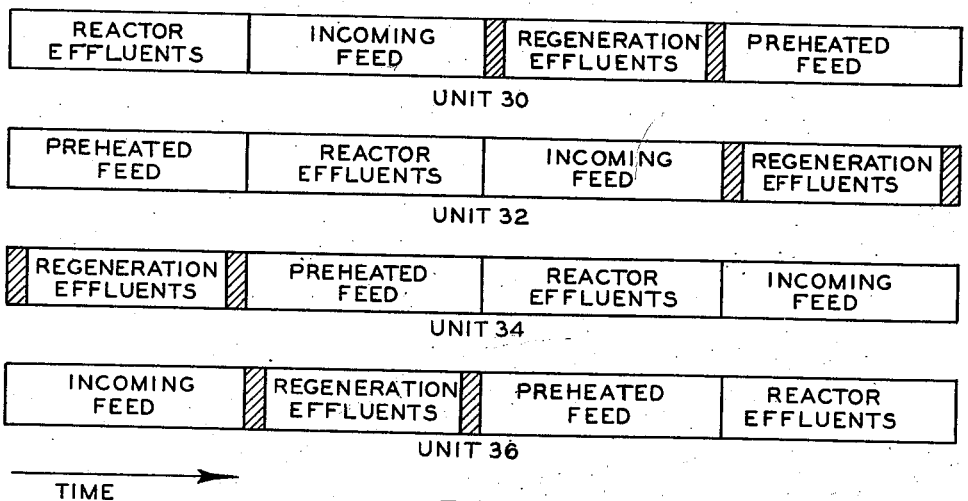
FIG.-2
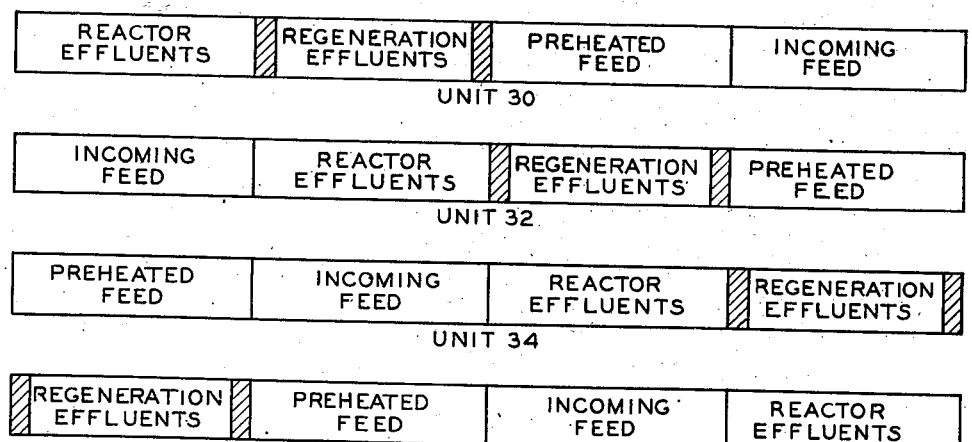
FIG.-3
 PURGE

Patented Apr. 10, 1945

2,373,358

UNITED STATES PATENT OFFICE 2,373,358

CATALYTIC PROCESS AND APPARATUS

John D. Upham and I. Louis Wolk, Bartlesville, Okla., assignors to Phillips Petroleum Company, a corporation of Delaware Application December 31, 1943, Serial No. 516,438

10 Claims. (Cl. 196—52)

The present invention relates to conversion processes wherein a mobile solid catalyst is utilized. It is especially applicable to the conversion of hydrocarbons at elevated temperatures using a powdered catalyst suspended in hydrocarbon vapors. In preferred embodiment it relates to heat utilization in such conversions, and to separation of finely divided catalyst from fluids. The invention is applied with particular advantage to endothermic conversions in which the catalyst is regenerated by the exothermic combustion of carbonaceous matter deposited thereon during conversion.

Many processes for the conversion of hydrocarbon materials to other hydrocarbon and/or non-hydrocarbon materials are now carried out with the aid of catalysts. In fact, catalytic processes, due to their greater selectivity and other advantages, are now displacing almost all types of non-catalytic operations in the petroleum industry. Merely as examples of such conversions may be mentioned the cracking of oils to products of lower boiling point, the formation of products of higher boiling point than the reactants as by polymerization or alkylation, the isomerization, hydrogenation, dehydrogenation, reforming, desulfurization, aromatization, partial oxidation, halogenation, etc., of hydrocarbon materials, which may be essentially pure individual hydrocarbons or mixtures of hydrocarbons. The process of the present invention is applicable to all such processes, as well as to other catalyzed chemical reactions generally. Inasmuch as the catalytic cracking of oils is an important, and in some respects typical, example of hydrocarbon conversion processes, the invention will be described in detail as applied to such a cracking process by way of example.

In the catalytic cracking of hydrocarbons, which is an endothermic reaction, a solid catalyst is ordinarily used, which may be disposed in a stationary bed, or which may flow through the system either as a moving bed of moderate-sized particles or as a finely divided powder which may be partly or entirely suspended in the reactant or regeneration gases. For example, in the so-called "fluid" catalyst system, the solid catalytic material is utilized in the form of a fine powder of say 200 to 300 mesh on down to a few microns in particle size. This powder is preferably "aerated" with gaseous hydrocarbon reactants, purge gases, or regeneration gases to such an extent that it is maintained in a freely-flowing or fluent condition. The catalyst is thus handled much as a liquid would be, and passed continuously in a closed circuit comprising a reaction chamber and regeneration chamber, as well as purging zones, stand-pipes, conduits and the like. Gaseous effluents from reaction and from regeneration zones are passed through cyclone separators or their equivalent to remove suspended catalyst therefrom, which may be returned to the zone whence it came or passed to the other zone. In such processes it is difficult to remove the last traces of the powder from the gas streams referred to. Normally the major portion, such as from 90 to 99 per cent, of the powder is separated out in one or a series of cyclone separators. The residual powder carried out in gaseous effluents of such separators has been a source of considerable trouble. It is either lost entirely from the system, or is recovered by other means which are expensive or which have inherent disadvantages. A small catalyst withdrawal from the system is required, accompanied by introduction of new catalyst make-up, for the purpose of maintaining the average activity of the catalyst, but the amount of residual catalyst escaping from the cyclone separators is greatly in excess of the required withdrawal. One method of recovering residual catalyst from reactor effluents is to pass the latter to a partial condensation or fractionation zone, wherein the catalyst powder may be separated in heavy liquid hydrocarbons condensed therein. When such liquid is recycled to the reactor, the catalyst is also returned, but without being regenerated. Furthermore, this does not allow removal of heavy ends from the system without carrying residual catalyst out therewith. For recovering residual powder from spent regeneration gases electrical precipitation is generally used, which of course is expensive with respect both to initial and operating costs. However, if such methods are not used, an almost prohibitively expensive catalyst loss is incurred, particularly when a synthetic catalyst is utilized.

Another method currently used in carrying out hydrocarbon conversions with a mobile catalyst is exemplified by the so-called "TCC" process in which a moving bed of catalyst is employed. In a typical operation of this type, granular catalyst of say from 4 to 60 mesh size is fed from a hopper to the top of a reaction chamber, and after gravity flow therethrough is removed from the bottom by means of a rotary valve or equivalent mechanism. The hydrocarbon material to be converted is usually passed in the vapor phase upwardly through the reactor counter-current to the catalyst flow. Reaction effluents are passed to suitable equipment for separation into the desired products, recycle stocks, and other components. Spent catalyst taken from the bottom of the reactor is purged of residual hydrocarbons and passed to the top of a regeneration zone which may be similar to the reaction zone in construction and operation. The catalyst passes down through the regenerator counter-current to a stream of air or other oxygen-containing gas which removes the carbon by combustion. Catalyst thus regenerated is purged of residual oxygen-containing material and passed by bucket elevators or other means to the top of the reactor for reuse. In systems of this type, attrition of the catalyst particles to form "fines" occurs to a marked extent, the magnitude of which depends on the properties of the particular catalyst used, as well as on reaction and regeneration conditions and on equipment design. Effluent conversion gases and/or regeneration gases sometimes carry such fines in suspension, thus presenting problems somewhat similar to, though usually less marked than, the problems mentioned above with respect to the "fluid" catalyst processes.

The various hydrocarbon and other conversions which are effected in the presence of solid catalysts are mostly carried out at elevated temperatures. Thus, substantial heat is required to raise the feed to reaction temperature. Furthermore, in the case of endothermic reactions such as cracking, the efficiency of conversion is effected by a temperature drop which would normally occur during reaction, and sufficient heat must be supplied to the reaction zone direct or to the feed to supply the endothermic heat of reaction. The heat contained in the hot effluents from the reaction zone is usually at least partly wasted during the cooling and fractionation required in order to effect separation of desired products. In the regeneration step, a substantial amount of heat is liberated by the exothermic combustion of carbonaceous matter on the catalyst, and various methods have been proposed for using a portion of the heat so liberated to supply heat for the endothermic conversion step or for other purposes. However a substantial amount or all of this heat is frequently wasted.

It is an object of our invention to effect chemical reactions with the aid of mobile catalysts.

It is another object to provide improved hydrocarbon conversion processes.

A further object is to supply heat to an endothermic conversion.

Another object is to recover a substantial amount of the sensible heat contained in gaseous conversion and/or regeneration effluents in processes of the nature described, and to utilize so recovered heat in the process.

A still further object is to improve catalytic operations in which powdered solid catalyst is present in effluent fluids.

Another object is to provide an effective method of separating powdered catalyst from suspension in gases and returning the thus-separated catalyst to the system.

Yet another object is to effect the cracking of hydrocarbon material in a so-called "fluid" catalyst system, whereby residual finely divided catalyst carried out of the system in conversion and regeneration effluents is recovered concomitantly with the recovery of sensible heat of such effluents, and whereby such recovered catalyst and heat are concomitantly returned to the reaction system.

A further object is to provide a process wherein exothermic heat of combustion from the regeneration zone and heat contained in effluent from the conversion zone are utilized in a novel and efficient manner to supply at least a portion of the heat required to preheat feed to the conversion zone.

Additional objects and advantages of the invention will be apparent, to one skilled in the art, from the accompanying disclosure and description.

Briefly stated, the present invention in preferred embodiment comprises subjecting hydrocarbons or other reactants to the action of a mobile solid catalyst, whereby fluid effluents from the reaction zone carry powdered catalytic material in suspension therein. Catalyst is subjected in a separate zone to contact with an oxygen-containing gas to burn off carbonaceous deposits from the catalyst and regenerate same, whereby fluid effluents from the regeneration zone also may carry powdered catalytic material in suspension therein. Such effluents from one or both zones are then passed to one or more heat and catalyst recovery zones wherein they are passed through a bed of particulate or granular heat-retentive material which has a particle size substantially greater than the powder, such that the fluids may pass therethrough without excessive resistance to flow. In this manner a substantial part of the sensible heat of the fluids is absorbed by the bed of heat retentive material while at the same time the powdered catalytic material carried out of the reaction and/or regeneration zone is separated from the fluids by deposition in said bed, which acts as a filter. The conversion and/or regeneration effluents are thus obtained free from suspended powder and at an appreciably lowered temperature. After the bed has become laden with powder and/or approaches the temperature of the fluid passing therethrough, a relatively cool fluid which it is desired to pass into the system, preferably feed to be converted, is passed through the bed in an opposite direction, whereby heat and powder are both picked up from the bed and returned to the system.

In a preferred manner of carrying out the present invention, heat contained in the effluents from either or both the reaction and regeneration zones is conserved for preheating feed to the conversion zone. By contacting hot effluents from the conversion or regeneration zones, or both, with refractory heat absorbent material arranged as filter beds, a substantial proportion of the sensible heat contained in these streams may be absorbed and retained very efficiently by direct heat exchange. Substantially all the powdered catalyst is also readily retained. On contacting hydrocarbon feed with the thus-heated refractory material, said feed may be preheated to a desired point by direct heat exchange, and by properly correlating the nature and volume of refractory material to the flow rate and contact time of the respective streams, and by alternating a plurality of heat absorbing zones between heat (and catalyst) absorbing and heat (and catalyst) liberating cycles important economies of heat, may be provided while permitting efficient operation of the catalytic process. In customary practice, the effluent from the conversion zone is at or near reaction temperatures and must be cooled prior to or during treatment for recovery of desired products. Thus it can be seen that in so doing the sensible heat contained in this stream is wasted. In accordance with present practice, carbon-deactivated catalysts are regenerated by oxidation of carbon with oxygen-containing gases at combustion temperatures. The resultant products of combustion are at elevated temperatures since the reaction is exothermic, and contain a great amount of sensible heat which it is desired to utilize in an efficient manner. In accordance with the present invention means are provided for separately absorbing heat from either the reaction effluent or the regeneration effluent, or both, on one cycle, giving up this heat to hydrocarbon feed on another cycle, while absorbing heat from effluents of this cycle in other heat absorbing means, the cycles being alternated in a manner which will enable the operation to be carried out continuously.

In referring to heat absorptive or retentive material, or refractory material, we mean a solid material having desirable thermal properties, particularly a relatively high heat conductivity. Such a material in the practice of this invention is used in a particle size, or range of particle sizes, which will provide a satisfactory filter bed for the particular fluids undergoing treatment. Specific aspects of particle size and filtering characteristics will be discussed in more detail below. With respect to the particular material to be used, desirable thermal qualities in such a material involve a high specific heat, high density, and high heat conductivity. It will be appreciated that the term "high" is a relative one, and that accordingly a wide range of materials may be useful in carrying out the invention, the choice of a particular heat absorbent being dependent on the conditions under which it is to be applied. It will further be understood that a given heat absorbent may be entirely satisfactory in one situation but not so suitable or even entirely unsuitable in a different situation. The material must of course have a melting point appreciably above the maximum temperature which is likely to be encountered, and must also be able to withstand such maximum temperatures without undergoing other undesirable changes. Ordinarily the heat retentive material is substantially inert under the conditions of use with respect to the fluids to be contacted and to the apparatus, and is preferably of a non-adsorptive nature. With these general limitations in mind, a listing may be made of some examples of materials suitable under various conditions for use in carrying out the invention. This listing is, of course, not intended to be all inclusive, and other suitable materials will be suggested to one skilled in the art by the disclosures offered herein.

The metals may be cited as one class of materials. With respect to thermal properties, the metals are more desirable than any other class of solids. However, certain of the metals are highly reactive, and hence may not be suitable for use in the presence of oxidizing or other active gases, such as those containing free halogens, acids, etc. Furthermore, the melting points of the metals are of course to be taken into consideration in making a choice for a specific application. The metals and in fact all solids, vary between one another in heat conductivity much more than in specific heat or density. For example, most metals operative in this invention have specific heats, at elevated temperatures of the order of 800° F., of between about 0.1 and 0.3 B. t. u. per pound per degree Fahrenheit, and few solids of any kind have specific heats much above about 0.4 under similar conditions. The densities of most metals are roughly in the range of about 400 pounds per cubic foot, although the lighter metals may be less than 200 pounds per cubic foot, and most non-metallic refractory solids which may be used in the present process have densities between about 100 and 200 pounds per cubic foot. In contrast, the heat conductivities of suitable metals may vary from about 200 B. t. u./hr./sq. ft./°F./inch in one case up to over 2000 in another case, and non-metallic solids which may be given consideration for use in carrying out our invention may have heat conductivities as low as 1. It is accordingly apparent that most of the solids will be similar with respect to density and specific heat, while they may be quite dissimilar with respect to heat conductivity. With due consideration being given to cost and other such factors, a solid having a high heat conductivity would ordinarily be selected for actual use, and specific heat and/or density would play a part in the final selection only in deciding between two or more solids of similar high heat conductivity.

Returning now to the metals, the following may be mentioned merely as examples having relatively high melting point, and are listed approximately in decreasing order of heat conductivity, that is from the highest to the lowest: copper, aluminum, brass, nickle, iron, mild steel, chromium alloys, etc. The thermal conductivity of the highest in this list, copper, is more than ten times that of the lowest in the list, chromium alloys, the former having a conductivity at 1000° F. of about 2400 B. t. u./hr./sq. ft./°F./in., and the latter having a conductivity of about 200. The above list of course is not exhaustive but merely suggestive, to one skilled in the art, of the wide variety of materials available and their range of properties. Choice of a metal for a specific step or cycle carried out in accordance with the teachings of this disclosure is made by taking into consideration first the melting point as compared with maximum temperatures prevailing in the system, then the chemical suitability. After some metals are thus eliminated, consideration is given to the availability and cost of the remaining suitable metals in desired particle size, then the heat conductivity and finally, if more than one metal still appears suitable, the density and specific heat are taken among the determining factors.

Considering now the non-metallic solids, it is immediately apparent that a lower order of heat conductivity is involved. However, due to factors such as cost, chemical inertness, resistance to attrition, and particularly to refractory qualities at high temperatures, a non-metallic solid is frequently more desirable than a metal. Artificial graphite and silicon carbide ("Carborundum") are outstanding in that their heat conductivities are far above those of any other non-metallic solid investigated. Graphite ranks with most of the metals, while silicon carbide is below the metals but still far above other non-metals. Graphite is subject to possible oxidation by oxygen-containing regeneration gases, and hence is seldom suitable for use in our invention. The heat conductivity of silicon carbide varies considerably with temperature, but generally speaking is within the range of about 100 (in the units used above), varying from 75 to 2500° F. to 125 at 1100° F. The reasons for our preference for silicon carbide thus become apparent when its thermal, mechanical, and chemical characteristics are considered.

Other non-metallic solids available for use in various modifications of the invention include the following examples listed in approximate decreasing order of heat conductivity (at elevated temperatures of 1500 to 2000° F.), which ranges from about 25 on down to about 1 to 2: fused alumina, magnesite, quartz, other forms of dense silica, fire clay, porcelain, rocks of various kinds, diatomaceous earth (fired), etc.

As stated above, the particle size, heat conductivity, and heat capacity of the solid material are correlated to give the desired rate of heat transfer. Hence the amount of heat absorbent used in a filter bed in carrying out the present invention will be greatly dependent on the flow rates, temperature and specific heats of gases treated, but the proper amount may readily be caluculated by one skilled in the art for any given conversion process, once the process variables are known. Inasmuch as the powdered catalyst carried in the effluent streams will always be of quite small particle size, although this will vary with gas velocities, size of the bulk of the catalyst used, and efficiency of any preliminary catalyst separating means used, some fairly specific data may be given on suitable particle size of solid heat absorbent used in making up the filter beds, and arrangement of such beds.

It is generally advantageous to provide a bed of substantial cross-section across the line of flow of gases. This ensures a relatively low velocity of flow through the bed which aids greatly both the filtering and the heat absorbing functions of the bed. It is further advantageous, although not essential, to employ a bed made up of graduated particle size, preferably one in which the top and bottom of the bed (if it is horizontal) are composed of relatively large particles, such as those having a diameter of about one-half to one-quarter of an inch, while the middle portion of the bed is composed of smaller particles, such as from 4 to 6 mesh down to say 20 mesh, but in any case not smaller than 100 mesh. This particular arrangement is very stable toward even relatively high rates of gas flow therethrough. While a clogging or packing of the bed with powdered catalyst is avoided, the complete removal of such powder from the effluents being treated is also assured. After a few runs, reverse flow of gas readily picks up substantially all the powdered catalyst deposited on the bed. Particle sizes in the range described also allow a very rapid transfer of heat by direct heat exchange with the gases.

Turning now to the drawings and description thereof for more specific application of the invention, Figure 1 shows in somewhat diagrammatic form a preferred arrangement of equipment, partly in elevation and partly cut away, together with flow of materials therethrough, which will serve to illustrate and also exemplify a preferred embodiment of the invention as applied to the "fluid" catalytic cracking of hydrocarbons. Figures 2 and 3 show schematically the time intervals during which various units are utilized for the different portions of two different four-stage cycles. It will be appreciated that the representations are merely schematic, that no attempt has been made to proportion the various units exactly to scale, and that in order to simplify the drawings numerous auxiliary items, such as fractionators, pumps, compressors, heaters, condensers, heat exchanges, valves, control instruments and the like, have been omitted, as their use is well understood by one skilled in the art once given the detailed disclosure provided herein. Accordingly the drawings and examples are not to be construed as unduly limiting the scope of the invention.

In Figure 1, chambers 10 and 12 are utilized respectively for reaction and regeneration. Powdered catalyst flows continuously through these two chambers by means of conduits 14 and 16 as shown. Lines 15 and 17 are provided for purging catalyst between zones. The catalyst may be any solid catalyst suitable for use in effecting a given conversion. In the case of gas oil cracking, by which the invention is being illustrated, a synthetic gel-type silica-alumina composite is frequently used. In some cases a less active, but cheaper, natural clay-like material such as an acid-treated montmorillonite clay of the nature of that sold under the trade name of "Super-Filtrol," will be preferred. A bed of the catalyst is maintained in each chamber, the level of the catalyst being indicated by dotted lines, and this level is readily adjusted to any desired height. The particle size of the catalyst is correlated with vapor velocities realized within the chambers so that the bulk of the catalyst remains in the "gasified" or "aerated" bed by virtue of being slightly heavier than that which could remain entirely suspended in reaction or regeneration gases. A frequently used particle size is from 200 to 400 mesh, but other sizes may be used under various conditions. All these factors are well known in the art and need not be further considered here.

Reactants enter line 16 from line 18 and carry the catalyst into chamber 10 by gas-lift action. The so-introduced reactants pass upward through the catalyst on into the vapor space above, then via line 19 into cyclone separator 20 wherein part of the catalyst remaining suspended in the vapors is separated and falls back down into the chamber through conduit 25. Vapors next may pass via line 21 into cyclone separator 23 for further separation of residual catalyst which is returned via line 27. It will be understood that one, two, or more separators of this type may be used as desired. However, the complete separation of catalyst in this manner is not feasible, as has been discussed before. Reactor effluents exit via line 22 and pass to further steps as will be described later.

In a similar manner, regenerating gas such as air, passes from line 24 into conduit 14, lifts the spent catalyst therein into chamber 12, effects combustion of carbon on the catalyst therein, and exits via lines 29 and 31 and cyclone separators 26 and 37, finally exiting through line 28 still carrying residual catalyst. From line 28 regeneration effluents are passed to further treatment in accordance with the invention, as will be described below. Catalyst from the two cyclones returns to chamber 12 by way of conduits 33 and 35.

While the above description has been directed to one advantageous method of carrying out the cracking and regeneration, other conventional methods differing in one or more respects from that shown may of course be used. Directing our attention next to the portions of the apparatus and flow which embody the concepts of the present invention; it will be seen that four chambers, 30, 32, 34, and 36, are shown with the outer wall partially or completely cut away. Each of said chambers contains a bed of granular heat retentive material such as carborundum, crushed firebrick, metal, etc., chosen in accordance with the principles hereinbefore set forth. Carborundum is preferred due to its high heat conducting properties. The heat retentive material is arranged in such manner as to allow flow of gases therethrough with minimum pressure drop consistent with an effective filtration effect. The bed thus acts not only to absorb or liberate heat, but also effectively removes the powdered catalyst from gases effluent from chambers 10 or 12. By reverse flow of gases, the thus-separated catalyst is readily picked up and returned to the conversion or regeneration zones as desired, as will appear more fully as the description proceeds. In order to illustrate more than one method of arranging the heat retentive material, a slightly different arrangement is shown in each chamber. Ordinarily, the same arrangement, chosen as optimum for a given set of conditions, will be used in each chamber.

In chamber 30 is shown a bed in which the particle size is graduated from large to small from the top to the middle and the reverse from the middle to the bottom. Powdered catalyst is shown deposited on top of this bed. In chamber 32 is shown a bed, supported on a relatively fine screen, which the particle size is graduated from large to small in only one direction, that is top to bottom. In chamber 34 is shown a bed in which strata of different particle size are separated by screens, thus contributing to the stability of the bed. In chamber 36 is shown a bed in which a uniform particle size is used. Such a bed is preferably deeper than one of graduated particle size to handle a given stream or streams, but has advantages not had by other arrangements. It will be appreciated that various arrangements are not necessarily exact equivalents While in some cases, particularly where different particle sizes are used in a bed, it is preferred to maintain the bed in the same arrangement without disturbance, in other cases, particularly when very little if any smaller particle sizes are used, it is preferred to subject the bed to an occasional or frequent shaking or rabbling action to dislodge any catalyst which may have become caked and is thus clogging passageways.

Provision of an empty space above and below the bed allows a drop in velocity of entering gases and also a more even flow thereof through the bed.

Lines 38, 40, 42, and 44 are connected with the four heat-retainer units shown (it is understood that the number may be less or greater than four in any given instance) so that hot gases, carrying suspended catalyst, from either line 22 or line 28 may be passed downwardly through any of the units. Certain of the connecting lines and valves are shown in the drawings without being numbered, since their use will be obvious to one skilled in the art in view of the detailed description of flows offered herein; to designate and describe each and every line and valve by a numeral would only serve to encumber the drawings and burden the description without contributing materially to an understanding of the principles of the invention or the specific methods of operating described. Gases, either conversion effluents or regeneration effluents, pass from the units, after downward flow therethrough, to product separation or other steps (not shown) via lines 46, 48, 50 and 52. The treatment of such effluents is well understood in the art, and need not be considered in further detail. Suffice it to say that unconverted gas oil is usually separated and recycled for further treatment, while gases, gasoline, naphthas, and bottoms of varying nature, depending on reaction conditions and feed stocks, are recovered for desired use. Regeneration effluents may be in part recycled, passed to waste heat boilers for recovery of sensible heat not retained in the heat-retaining zones, discarded, or given other handling as conditions warrant.

Lines 54, 56, 58 and 60 are connected to provide up-flowing fluids to units 30, 32, 34, and 36 respectively. These lines are connected to line 62, carrying a purge gas such as steam or an oxygen-free flue gas, and, to line 64, carrying relatively cool incoming reactants such as gas oil. Reactants pass from any one of the heat retaining units via lines 76, 78, 80, or 82 into line 66, and thence to line 18 for introduction into the reactor 10. Additional reactants may be introduced into line 18 through line 70, as and if required. A heater 74 is interposed in line 18 for heating reactants additionally, if required. Any purge gas introduced into the heat-retainer units to purge hydrocarbons therefrom is ordinarily passed on into line 66 and thence to the reactor where it acts merely as a diluent, and also insures recovery of hydrocarbons and any catalyst picked up from the zones. However, it may be discarded or passed to other points in the system through lines 84, 86, 88, or 90 if desired. Purge gas introduced from conduit 62 to purge out regeneration effluents is usually taken out of the units through the last-named lines. It will generally be preferable, however, to introduce this purge through lines 84, 86, 88, and 90, and exhaust the same through lines 46, 48, 50 and 52; down-flow in this manner avoids picking up any deposited catalyst from the top of the filter-heat retainer bed. In the event a two-stage preheating of feed is desired, which will be described in detail below, line 92 branches off from line 64 and is connected to lines 38, 40, 42, and 44 to carry incoming reactants to the top, rather than the bottom, of the units. Reactants which are thus introduced are preheated without picking up catalyst, and then may be passed to the bottom of any other unit, by means of line 94 and its connections, for further preheating and for picking up catalyst prior to their final passage through line 66 and into the reactor.

In one mode of operation, in which heat-retaining unit 36 is not used, incoming reactants, either liquid or vapor, from line 64 pass upwardly through unit 30, thereby being heated by absorption of heat previously stored therein, and picking up powdered catalyst from the top of the bed which has been previously deposited thereon. The reactants plus catalyst then pass to chamber 10 via lines 66, 18 and 16. After passing through chamber 10, the converted hydrocarbons exit via line 22, and pass via line 40 downward through unit 32, wherein residual powdered catalyst deposits out on and in the bed of heat retentive material, which is concomitantly heated by absorbing sensible heat from the reaction products, which finally pass via line 48 to fractionation. Meanwhile, regeneration gas is introduced into chamber 12 from line 24, and exits via line 28, passing therefrom via line 42 into the top of heat-retaining unit 34, wherein residual catalyst is separated out and heat is absorbed. The cooled catalyst-free gas exits through line 50.

After a relatively short period of operation, generally on the order of a few minutes, unit 30 becomes cooled, unit 32 becomes heated to a temperature close or equal to that of the reactor effluents, and unit 34 becomes heated to a temperature close or equal to that of the spent regeneration gases. The flow of gases through these units is then switched so that incoming reactants pass through unit 34 which is now at the highest temperature, reactor effluents pass through unit 30 which is at the lowest temperature, and regeneration-effluents pass through unit 32 to impart additional heat and temperature thereto. In this way the cycle is continued indefinitely. Thus one heat retainer-filter unit goes continuously through the following cycle:

1. Reactor effluents down.
2. Regeneration effluents down.
3. Reactants up.

As an example, typical temperatures of the streams in a catalytic cracking of gas oil are:

|   | °F. |
|---|---|
| Reactor effluents | 900 |
| Regeneration effluents | 1,150 |
| Incoming reactants | Below 900 |

The actual temperature of the incoming reactants determines the amount of additional preheat if any, imparted thereto either before contact with the hot filter bed or by heater 14 after such contact. It is generally preferred to contact the relatively cool feed with the filter bed to absorb the maximum amount of heat therefrom, and to bring the thus-preheated feed to final reaction temperature by means of heater 14. However, the reverse procedure is also suitable. In any event, a temperature rise in the feed of from 100 to 400° F. more or less is obtainable by passage of feed over the hot filter bed. No attempt is made here to set out the limits of reaction conditions under which gas oil cracking or any other conversion and/or regeneration may be carried out in reactor 10 and/or regenerator 12, for this is well within the knowledge of the art, and is not an essential of the invention.

An additional, and preferred, mode of operation utilizes four heat- and catalyst-retaining zones. This cycle, from the viewpoint of one unit, comprises the following four stages:

1. Reactor effluents down.
2. Incoming feed down.
3. Regeneration effluents down.
4. Feed (preheated in step 2) up.

Lines 92 and 94 are used for carrying feed in this modification. In such a cycle, step 1 imparts heat to the bed and also deposits catalyst, step 2 recovers heat, but not catalyst, step 3 imparts heat (at a higher temperature than step 1) and also deposits additional catalyst, and step 4 recovers additional heat, thus bringing the partially heated feed to a temperature equal to or near reaction temperature, and also picks up catalyst deposited from both the reactor and regeneration effluents and carries same back into the reactor for reuse. This cycle is usually somewhat more advantageous than the three-stage cycle previously described in that a larger proportion of the sensible heat of the effluents is recovered with less temperature variation in the feed passed through line 66.

In any cycle, it is quite advantageous that each bed undergo contact with regeneration effluents, as this tends to burn off any carbon which may have a tendency to accumulate therein.

To provide a more readily visualized description of a cycle of the nature just described, Figure 2 is presented. In Figure 2, each horizontal bar represents one unit as designated. The total length of the bar represents the time required for a complete cycle, and within the bar is described the flow of material taking place during a given interval of time. By reference to this figure, one may readily determine the course a given stream will take during an entire cycle, and also the flow through each filter-heat transfer unit at any given time.

It will be noted that Figure 2 provides for a purging in between hydrocarbons and regeneration gas. The necessity for a purge will be determined in a given case by the volume of the filter units, the tendency to hold hydrocarbons or oxygen tightly on the surface of the heat retentive medium, the oxygen content of the regeneration effluents, etc. A purge may be required in some cases to prevent combustion or explosion in the units by mixing of hydrocarbons with oxygen-containing gases. In other cases it may not be necessary. The determination is well within the skill of the art. In the embodiment illustrated by Figure 2, a short purge with steam is used before and after passage of regeneration effluents through a unit. The simplest method of accomplishing this with only four units while still maintaining continuity of flow is merely to vent regeneration effluents during the short period required for purging. While this permits some loss of heat and catalyst, a small catalyst withdrawal from the system is necessary any way, and may be thus provided for. If it is preferred to prevent such loss of heat and/or catalyst, an additional unit may be employed, through which regeneration effluents may pass several times prior to flow of feed therethrough, or use of the units may be staggered to keep each one in continuous operation, the extra time in the cycle required for purging, being thus taken care of.

Preferably, the purge following passage of regeneration effluents is in a downward direction to avoid picking up catalyst. The purge following passage of hydrocarbons, however, may be either down or up, and the purge gas is preferably introduced into the reactor. By using an up-flow purge, the steam or other purging gases may be used to pick up a substantial part of the catalyst and/or heat and return the same to the system.

Another advantageous 4-stage cycle is illustrated in Figure 3, following the same conventions used in Figure 2. This cycle differs from that of Figure 2 in that a given unit, after having contacted reactor effluents, is next contacted with regeneration effluents. After this the preheated feed is passed upwardly for picking up final preheat and catalyst and then the partially cooled bed is contacted with cold feed. It will be readily seen that one cycle may be more advantageous than another in one instance, while the reverse will be true in another instance. The factors influencing the choice of a cycle include primarily the temperature of feed available and the temperature differential between reaction and regeneration zones.

It will be seen that various other cycles may be used as is most convenient for a given process, in which the temperatures and flow-rates of the various streams, extent of catalyst deactivation, etc., must be taken into consideration. It is required that a fluid carrying powder first be passed through a heat-retentive unit in one direction, and a fluid be then passed through the same unit in an opposite direction, picking up the powder previously deposited therein and carrying it to a desired point in the system, while heat exchange is concomitantly being effected between the heat-retainer and said fluids. Two or more different streams of fluid may be passed in turn through such a unit in the same direction between periods of opposite flow.

We have not attempted to show means for automatically controlling these cycles, for such means will be obvious to one skilled in the art once given the disclosure of the method of operating such cycles offered herein. Furthermore, it will be appreciated that during the flow of a stream through a single bed, the temperature of the stream leaving the bed will be subject to variation as the temperature of the heat retaining material approaches the temperature of the incoming stream. Such variations in temperature may be sufficiently minor as not to disturb unduly the functioning of subsequent operations in the stream, or may be partially or completely compensated for by auxiliary variable heating (or cooling) means.

Although the heat retainer-filter units shown in the drawing are depicted as horizontal beds, they may of course be vertical, with horizontal flow therethrough, or inclined or other suitable positions. While the powder is shown deposited on top of the bed, the directions of flow may of course be opposite, with the powder being deposited on and picked up from the bottom of the bed as desired. Furthermore, the units may be of variable cross-section of different levels in the bed; for example conical beds may be used.

The foregoing procedure may be applied to any hydrocarbon conversion reaction conducted at elevated temperatures and which requires preheating of feed, and in which catalyst is deactivated by deposition of carbon thereon. Such reactions, besides cracking, include dehydrogenation, aromatization, desulfurization, reforming, polymerization, etc. The invention has been described primarily with reference to conversion processes effected at temperatures lower than regeneration temperatures, which is the more usual case. In instances wherein conversion temperatures are above regeneration temperatures, suitable modifications may be made readily by one skilled in the art so that the feed being preheated will always come into contact with the hottest body of heat retentive material last. These and many other modifications will be obvious to one skilled in the art in view of the disclosure herein.

We claim:

1. A method of cracking gas oil which comprises continuously flowing a powdered solid cracking catalyst through a closed circuit comprising a reaction zone and a regeneration zone; passing gas oil vapors at cracking conditions of temperature and pressure through said reaction zone; passing an oxygen-containing gas through said regeneration zone under conditions to burn carbonaceous matter from said catalyst and reactivate same; recovering hot gases effluent from said reaction zone and containing residual powdered catalyst; passing same through a first filter bed composed of solid heat retentive particles, previously cooled by contact with preheated gas oil feed, to deposit said catalyst in said bed and to absorb heat from said gases; recovering hot gases effluent from said regeneration zone containing residual powdered catalyst at a temperature higher than said gases effluent from said reaction zone; passing same through a second filter bed composed of solid heat retentive particles, previously cooled by contact with cold gas oil feed whereby said feed was preheated, to deposit said catalyst in said bed and to absorb heat from said gases; passing cold gas oil feed through a third filter bed composed of solid heat retentive particles, previously heated by contact with hot reaction zone effluents passed in the same direction therethrough, to preheat said gas oil feed by recovery of heat from said particles; passing thus-preheated gas oil feed through a fourth filter bed composed of solid heat retentive particles, previously heated by contact with hot regeneration zone effluents and having powdered catalyst therein filtered out of reaction zone effluents and regeneration zone effluents passed in the opposite direction therethrough, to further heat said preheated feed nd to pick up said catalyst from said filter bed; and passing into said reaction zone so-heated gas oil feed carrying said catalyst thereby returning heat and catalyst to said zone.

2. The method of claim 1, in which said second filter bed is purged with an inert gas before and after passage of said regeneration zone effluents therethrough.

3. A method of cracking gas oil which comprises continuously flowing a powdered solid cracking catalyst through a closed circuit comprising a reaction zone and a regeneration zone; passing gas oil vapors at cracking conditions of temperature and pressure through said reaction zone; passing an oxygen-containing gas through said regeneration zone under conditions to burn carbonaceous matter from said catalyst and reactivate same; recovering hot gases effluent from said reaction zone and containing residual powdered catalyst; passing same through a first filter bed composed of solid heat retentive particles, previously cooled by contact with cold gas oil feed whereby said feed was preheated, to deposit said catalyst in said bed and to absorb heat from said gases; recovering hot gases effluent from said regeneration zone containing residual powdered catalyst at a temperature higher than said gases effluent from said reaction zone; passing same through a second filter bed composed of solid heat retentive particles, previously heated by contact with hot gases effluent from said reaction zone, to deposit said catalyst in said bed and to absorb further heat from said gases; passing cold gas oil feed through a third filter bed composed of solid heat retentive particles, previously contacted with preheated gas oil feed, to preheat said cold gas oil feed by recovery of heat from said particles; passing thus-preheated gas oil feed through a fourth filter bed composed of solid heat retentive particles, previously heated by contact with hot regeneration zone effluents and having powdered catalyst therein filtered out of reaction zone effluents and regeneration zone effluents passed in the opposite direction therethrough to further heat said preheated feed and to pick up said catalyst from said filter bed; and passing into said reaction zone so-heated gas oil feed carrying said catalyst, thereby returning heat and catalyst to said zone.

4. The method of claim 3, in which said second filter bed is purged with an inert gas before and after passage of said regeneration zone effluents therethrough.

5. In a process for the catalytic conversion of hydrocarbons in which a mobile solid catalyst is deactivated by deposition of carbon thereon in a reaction zone and reactivated by contact with oxygen-containing gas in a regeneration zone, and in which gaseous effluents from said zones contain catalyst "fines", the steps which comprise contacting effluents from said reaction zone at substantially reaction temperature with a first body of heat retaining particles arranged as a filter bed, contacting effluents from said regeneration zone at substantially regeneration temperature with a second body of heat retaining particles arranged as a filter bed, and preheating a hydrocarbon feed prior to introduction into said reaction zone and returning said catalyst "fines" to said reaction zone by contacting said feed first with the cooler of said bodies and then with the hotter of said bodies, said latter contacting being effected under conditions adapted to suspend in said feed fines primarily retained in said body by filtering action.

6. In a process for the catalytic conversion of hydrocarbons in which a mobile solid catalyst is deactivated by deposition of carbon thereon in a reaction zone and reactivated by contact with oxygen-containing gas in a regeneration zone, and in which gaseous effluents from at least one of said zones contain catalyst "fines," the improvement which comprises passing effluents from the cooler of said zones downwardly through a filter bed composed of heat absorptive particles, then passing effluents from the hotter of said zones downwardly through said filter bed, whereby heat is absorbed from effluents of both said zones and said "fines" are deposited on and in the upper portions of said bed, then passing hydrocarbons to be converted upwardly through said bed to pick up said heat and said "fines" and thence into said reaction zone.

7. The process of claim 6, wherein said heat absorptive particles comprise silicon carbide.

8. Apparatus for catalytic conversion of hydrocarbons which comprises a reaction chamber and a regeneration chamber, means for flowing powdered solid catalyst through a circuit comprising said chambers, a pair of filter beds composed of heat retentive particles, means for flowing hydrocarbon reactants through said reaction chamber, means for separating the bulk but not all the powdered catalyst from reaction chamber effluents, means for passing said reaction chamber effluents through one of said pair of filter beds, means for flowing oxygen-containing gas through said regeneration chamber, means for separating the bulk but not all of the powdered catalyst from regeneration chamber effluents, means for passing said regeneration chamber effluents through the other of said pair of filter beds, means for passing hydrocarbon reactants through said pair of filter beds, said passage through the last of said pair of filter beds being in a direction opposite to the flow of effluents therethrough, and means for passing reactants from the last of said pair of filter beds into said reaction chamber.

9. A method for catalytic conversion of hydrocarbons which comprises flowing a finely divided conversion catalyst through a reaction zone and a regeneration zone; passing hydrocarbons under conversion conditions of temperature and pressure through said reaction zone; passing an oxygen-containing gas through said regeneration zone containing catalyst deactivated by deposition of carbonaceous material thereon in a previous conversion under conditions to burn carbonaceous material therefrom and reactivate same; recovering hot gases effluent from said reaction zone and containing residual powdered catalyst; passing same through a first filter bed composed of solid heat retentive particles, previously cooled by contact with preheated hydrocarbon feed, to deposit said catalyst in said bed and to absorb heat from said gases; recovering hot gases effluent from said regeneration zone containing residual powdered catalyst at a temperature higher than said gases effluent from said reaction zone; passing same through a second filter bed composed of solid heat retentive particles, previously cooled by contact with cold feed whereby said feed was preheated, to deposit said catalyst in said bed and to absorb heat from said gases; passing cold feed through a third filter bed composed of solid heat retentive particles, previously heated by contact with hot reaction zone effluents passed in the same direction therethrough, to preheat said feed by recovery of heat from said particles; passing thus-preheated feed through a fourth filter bed composed of solid heat retentive particles, previously heated by contact with hot regeneration zone effluents and having powdered catalyst therein filtered out of reaction zone effluents and regeneration zone effluents passed in the opposite direction therethrough, to further heat said preheated feed and to pick up said catalyst from said filter bed; and passing into said reaction zone so-heated feed carrying said catalyst thereby returning heat and catalyst to said zone.

10. A method for the conversion of hydrocarbons which comprises continuously flowing a powdered solid conversion catalyst through a closed circuit comprising a reaction zone and a regeneration zone; passing hydrocarbon vapors at conversion conditions of temperature and pressure through said reaction zone; passing an oxygen-containing gas through said regeneration zone under conditions to burn carbonaceous matter from said catalyst and reactivate same; recovering hot gases effluent from said reaction zone and containing residual powdered catalyst; passing same through a first filter bed composed of solid heat retentive particles, previously cooled by contact with cold hydrocarbon feed whereby said feed was preheated, to deposit said catalyst in said bed and to absorb heat from said gases; recovering hot gases effluent from said regeneration zone containing residual powdered catalyst at a temperature higher than said gases effluent from said reaction zone; passing same through a second filter bed composed of solid heat retentive particles, previously heated by contact with hot gases effluent from said reaction zone, to deposit said catalyst in said bed and to absorb further heat from said gases; passing cold feed through a third filter bed composed of solid heat retentive particles, previously contacted with preheated hydrocarbon feed, to preheat said cold hydrocarbon feed by recovery of heat from said particles; passing thus-preheated hydrocarbon feed through a fourth filter bed composed of solid heat retentive particles, previously heated by contact with hot regeneration zone effluents and having powdered catalyst therein filtered out of reaction zone effluents and regeneration zone effluents passed in the opposite direction therethrough to further heat said preheated feed and to pick up said catalyst from said filter bed; and passing into said reaction zone so-heated feed carrying said catalyst, thereby returning heat and catalyst to said zone.

JOHN D. UPHAM.
I. LOUIS WOLK.